United States Patent [19]
Miller

[11] 3,878,444
[45] Apr. 15, 1975

[54] METHOD AND APPARATUS FOR PROTECTING ELECTRICAL FIELD CABLES AGAINST RODENT DAMAGE

[75] Inventor: Shelond M. Miller, Tulsa, Okla.
[73] Assignee: Tesco Engineering Company, Tulsa, Okla.
[22] Filed: Jan. 21, 1974
[21] Appl. No.: 435,210

[52] U.S. Cl.............. 317/262 S; 174/115; 307/149
[51] Int. Cl........................... H05c 1/00; H01b 7/00
[58] Field of Search...... 317/262 S; 43/98; 174/115; 307/149

[56] References Cited
UNITED STATES PATENTS
| | | | |
|---|---|---|---|
| 2,691,698 | 10/1954 | Schmidt............................ | 174/115 |
| 3,610,808 | 10/1971 | Horwinski......................... | 174/115 |
| 3,763,482 | 10/1973 | Burney et al. ................... | 174/115 |
| 3,773,109 | 11/1973 | Eberline............................ | 174/115 |

Primary Examiner—L. T. Hix
Attorney, Agent, or Firm—Daniel Silverman

[57] ABSTRACT

This abstract describes an improved construction for electrical field cables, for protection against rodent damage, and a method of operation of such cables. The cable construction provides a plurality of electrical conductors and a cylindrical jacket surrounding and binding the conductors. a wire wrapping surrounds the jacket, and the wrapping is covered by means of an outer covering or jacket. In use, the wrapping is connected to a selected potential above ground, so that when a rodent, or larger animal, bites the cable and connects with the wire wrapping, the voltage on the wrapping will be impressed on the animal to ground. The voltage is of a magnitude such as to provide a mild shock to the animal so as to deter it from again biting the cable. A further improvement provides a switch means that connects the potential to the wrapping at all times that the electrical conductors are not in use, that is, at all times that the conductors are not usefully connected to a using apparatus.

9 Claims, 5 Drawing Figures

PATENTED APR 15 1975          3,878,444

METHOD AND APPARATUS FOR PROTECTING ELECTRICAL FIELD CABLES AGAINST RODENT DAMAGE

BACKGROUND OF THE INVENTION

This invention lies in the field of electrical cables. More particularly it is concerned with electrical cables that are used in field operations. Still more particularly it is concerned with field operations where the cables are used in lengths of many thousands of feet, in areas of the country where there are animals that might injure the cables by biting into them and destroying the insulation, or even severing one or more conductors. The cables used in field seismic geophysical operations are of this type.

The damage that can be done to field cables in wild or undeveloped areas of the country, where there are wild rodents or other small animals, or where there are large tame animals, is well known. Not only are such animals active in the night time, but they may inflict damage to cables even in the daytime, so long as the cables are long enough so that there will be long unattended portions of the cables.

Such damage is very disturbing to field operations, particularly in seismic operations, where a high degree of insulation is required on the conductors. The reason for this is that small leakages to ground may cause considerable electrical noise to be generated on the conductors. The seismic signals impressed on the conductors are very small, and stray electrical signals generated in the conductors by such leakages to ground, can be many times larger than the useful signals. Thus it is important to prevent such damage to the cables.

On occasion, in areas where there has been considerable rodent damage to cables, operators have disconnected electrical instruments from the conductors of the cable after working hours, and impressed on the conductors, connected together, a selected electrical voltage. If and when the animal bites through the jacket, it will bite into one or more of the conductors, and be exposed to the electrical voltage. This shock serves as a deterrent to repeating the biting process. This system did have some deterrent action. However, the deterrent was only applied after useable cable conductors and jacket had been damaged. Also, the deterrent voltage could only be used at night, while the cables were not otherwise being used.

SUMMARY OF THE INVENTION

It is a primary object of this invention to provide an improved cable construction which is adaptable to operation, such as to deter rodents and other animals from damaging the cables. It is a further object of this invention to provide a method of operation of such deterrent so that it can be used at any time that the electrical conductors are not in useful operation. Thus the deterrent can be used at night time, and also during the day, except for the relatively short times when the cables are otherwise in use.

These and other objects are realized and the limitations of the prior art devices are overcome in this invention, by using an additional wrapping of conductors on the outside of the conventional jacket of the multiconductor cable, and covering the wrapping with an outer covering or jacket. Thus, separating the wrapping, or the deterrent winding from the electrical conductors makes it possible to apply the deterrent without the use of the cable conductors. Thus, potential can be applied to the deterrent winding through a switching means which simultaneously applies a deterrent voltage to the wrapping at the same time it removes power from the apparatus, (such as seismic amplifiers) that are utilizing the conductors. It is this ability to switch the deterrent voltage on as the conductors are taken out of use, and vice versa, that makes it possible to use this deterrent system throughout the entire day, except for the relative short times that the conductors are being used to carry signals. In cases where high level signals are impressed on the conductors, and possible noise generated by simultaneous voltage on the wrapping is not objectionable, such voltage can be left on the wrapping at all times.

BRIEF DESCRIPTION OF THE DRAWINGS

These and other objects and advantages of this invention and a better understanding of the principles and details of the invention will be evident from the following description taken in conjunction with the appended drawings, in which.

DESCRIPTION OF THE PREFERRED EMBODIMENT

Figure 1:
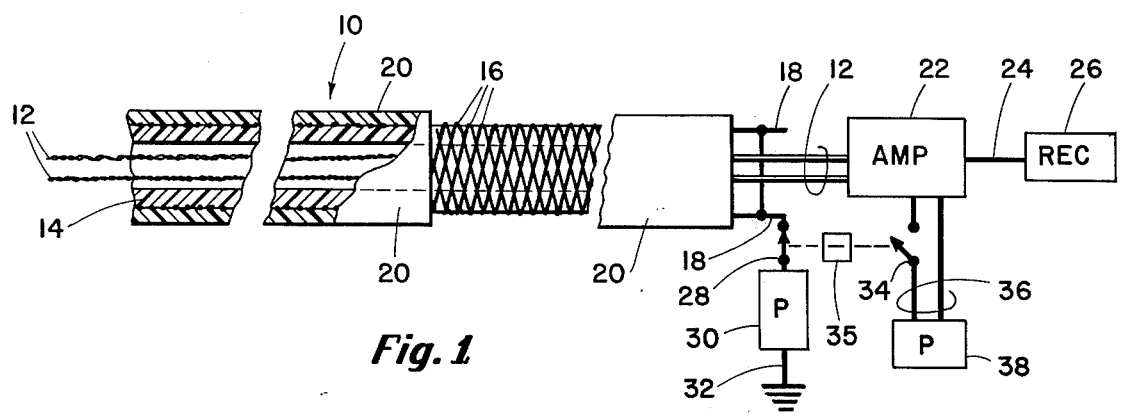
FIG. 1 shows a view of the improved cable of this invention, partly in section, and shows the method of operation whereby the deterrent voltage is applied whenever the power to the utilizing instrument is removed.

Referring now to the drawings, and in particular to FIG. 1, there is indicated generally by the numeral 10 one embodiment of this invention. A cable composed of a plurality of conductors 12, preferably in the form of twisted pairs, are formed into a circular conductor bundle and a jacket 14 is applied around them to bind and protect them. Although only 4 conductors are shown, as many conductors as desired can be used. The jacket is usually of a rubber compound, or tough plastic, as is well known in the art. The conventional cables in field use, such as in the geophysical industry are of this type.

Around the outside of the jacket 14 is wound a plurality of small wires 16. These can be small uninsulated wires, of steel, copper or aluminum, or other metal. They may be wound in a single spaced layer, in helical fashion, or they may be wrapped in an open braid, or any other way. Generally they are spaced apart so that a second covering or jacket, such as 20 can be applied over the wrapping to protect it. The jacket 20 need not be as strong or as protective as the inner jacket 14, which directly protects the electrical conductors, which are of primary concern. Still, the wrapping, or the deterrent winding, must also be protected if it is to maintain a suitable magnitude of voltage. Otherwise, if the outer jacket 20 is removed and the wrapping 16 contacts the earth, theremay be sufficient leakage of current that there will not be a high enough voltage on the deterrent winding to accomplish the desired result.

The second or outer covering or jacket 20 can be of natural or synthetic rubber compound, or tough plastic such as polyurethane. Any suitable material, and in suitable thickness, such as are conventionally used will be satisfactory.

At some point along the cable, that is, at either end, or at some intermediate point, such as the junction between multiple lengths of the cable, a voltage can be applied to the wrapping 16. Illustrated in FIG. 1 is the case where the voltage is applied to the conductors 18 of the braid or wrapping 16, through a switch 28, shown in the closed position, from a power supply 30, the second terminal of which is grounded at 32. This would be at the end of the cable at the recording truck (for example), in which amplifiers 22 and recorder 26 are shown. Normally, in seismic operations, the amplifiers 22 are provided with power from a source 38 such as batteries, through cables 36. There is a switch 34 to apply and remove power, which is done each time that a record is to be taken.

While the voltage from source 30 can be applied at all times to the winding 16, even while the power is applied to the amplifier, it would not be desireable to have that voltage on while the record is being recorded, because of the possibility of generating noise in the recording conductors. Thus an interconnection 35 is provided between the switch 28 in the deterrent circuit, and the switch 34 in the amplifier power circuit, so that when one is open, the other is closed, and vice versa. Thus, since the amplifiers are on only for a short time (about 1 minute or less) each time a record is made, the protecting or deterrent voltage can be left on the wrapping at all other times. The interconnection mechanism 35 used to control the switches 28, 34 can be a relay, solenoid operated switch, a manual switch, etc., such as is well known in the art.

In the case of seismic cables there is a particular feature that requires attention, and that is the so called "takeout." In operation, each of the conductors in the cable is connected to one of a plurality of geophone groups, spaced in a selected manner along the length of the cable. The takeout provides the means to connect the conductor pairs to the geophones.

Figure 2:
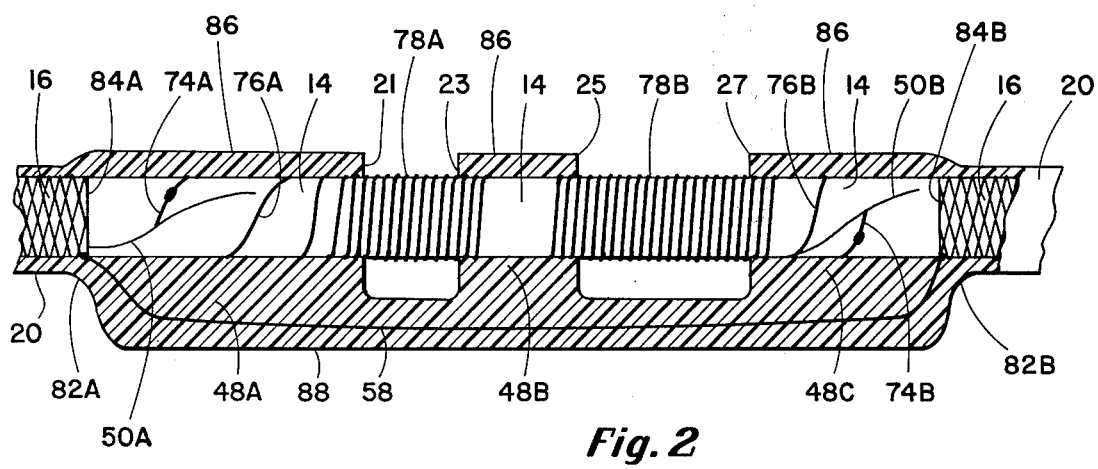
FIG. 2 shows a portion of the cable with a conventional takeout, whereby instruments such as geophones can be connected to the cable.

As indicated in FIG. 2, in preparing the takeout, the outer covering or second jacket 20 must be stripped off over a length of several inches from 82A to 82B. Also, the wrapping 16 must be removed over the length 84A to 84B, to expose the jacket 14 of the cable. A slit 50A in the jacket 14 is made at one end of the exposed length. Opening the slit 50A, the appropriate conductor is found and cut, and the end 74A is taken out of the slit. This end 74A is connected to a bare conductor 76A, which is wrapped in a tight helix 78A around the jacket 14. Similarly, a slit 50B in the jacket is made at the other end of the space 82A 82B and the second conductor of the pair is found, cut, and taken out 74B, connected to the wire 76B, which is wrapped in the helix 78B.

In the normal takeout, a new thicker jacket 86 is molded to the outer covering 20 from 82A to 82B, leaving gaps 21-23 and 25-27, exposing the wire helices 78A and 78B. A special clip (not shown) is attached to the terminals of the geophone and makes contact with the wires 78A and 78B. Generally a stiffening rib 88 is provided along the side of the cable to minimize the flexing of the cable, which might cause breakage of the conductors in the takeout.

Figure 3:
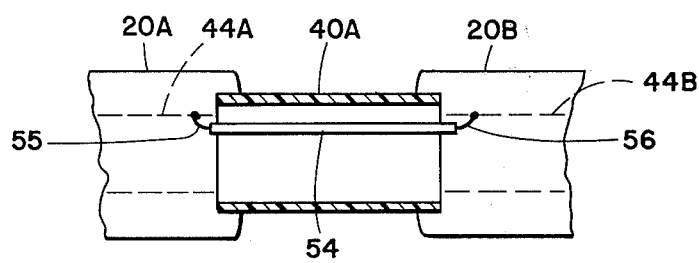
FIG. 3 illustrates further detail of the takeout.

The takeout illustrated in FIG. 2, and other well known ways of constructing takeouts form no part of this invention. They are described only for the purpose of indicating that in preparing the takeout the outer jacket and the wire wrapping must be removed over a short length of the cable. Thus, some means must be provided for maintaining the continuity of the wire wrapping or braid across the gap 84A to 84B. Where the stiffening rib 88 is provided, a wire 58 can be connected to the braid at 84A and at 84B, and can be molded into the rib 88. Where a rib is not provided in the takeout, the gap in the braid 16 can be bridged by having an extra conductor in the cable. This conductor can be found and taken out at the slits 50A and 50B and the ends respectively connected to the braid at the points 84A and 84B. Also, in other forms of takeouts, as illustrated in FIG. 3, it is possible to insert a short insulated conductor 54 into the conductor bundle, which is connected at 55, 56 to the ends of the braid 44A, 44B. The important thing is that there must be electrical continuity in the braid or wrapping across all of the takeouts.

When, as is customary, the cables are constructed in separate sections or segments, an extra terminal must be provided in the terminating plugs so that with the braids or deterrent windings connected to these terminals, there will be electrical continuity between the wrappings or braids of each of the seriesconnected segments of the cable.

Figure 4:
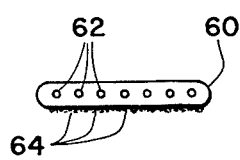
FIG. 4 illustrates the construction of a multiconductor flat cable with adhesive along one surface, which can be helically wrapped around a conventional cable to convert it to an improved cable of this invention.
Figure 5:
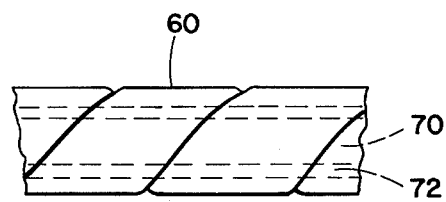
FIG. 5 illustrates a view of the cable wrapped with the strip of FIG. 4.

In FIGS. 4 and 5 there is shown another embodiment of this invention. This involves a thin flat cable or tape, comprising a plurality of longitudinal wires 62 embedded in a tough plastic jacket. This cable can be used as a tape, and with suitable adhesive 64, can be applied, in a helical wrapping, to the outside of the jacket 72 of a conventional cable having conductors 70. The wrapping is applied so as to provide a continuous smooth outer surface of the tape 60, the wires 62 serving as the deterrent wrapping on the outside of the inner jacket 72.

While any suitable voltage may be used between the deterrent winding and ground, a voltage of the order of 24 volts, a.c. or d.c. has been found satisfactory. This can be provided by batteries or by units such as fence chargers, etc.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. An improved multiple conductor electrical field cable system, comprising;
    a. an improved cable comprising;
        1. a plurality of insulated conductors forming a cylindrical core;
        2. a jacket surrounding and binding said conductors;

3. a conductive wrapping around said jacket for a substantial portion of the length of said cable; and
4. covering means over said cable and wrapping;

b. electrical means to utilize said electrical conductors;

c. means to apply an electrical potential of selected magnitude between said wrapping on said cable and earth ground; and d. wherein said means to apply comprises first switch means to apply potential to said wrapping, second switch means to apply power to said means to utilize said conductors, and means to keep said first switch open when said second switch is closed and vice versa.

2. In an electrical system including a long electrical cable resting on the surface of the earth, said cable comprising a central cylindrical bundle of insulated conductors, and a circumferential jacket covering and binding said conductors,
at least one conductive wrapping around said cable jacket
and covering means over said wrapping
and electrical means to utilize said insulated conductors, the method of operation of said system comprising the steps of:

a. applying electrical power to said electrical means to utilize;

b. utilizing said conductors for a selected period;

c. at the end of said selected period removing said electrical power from said electrical means to utilize; and d. applying an electrical potential of selected magnitude between said wrapping on said cable and earth ground;

whereby said electrical power and said electrical potential are applied alternately to said means to utilize and said wrapping respectively.

3. The system as in claim 1 including at least one takeout in said improved cable and including means to connect said wrapping on one side of said takeout to said wrapping on the other side of said takeout.

4. The system as in claim 1 including at least two sections of said improved cable means, each of said sections connected by multiple terminal plug means and at least one terminal in each of said plug means is connected to said wrapping in that section of cable to which said plug means is connected; whereby when the conductors in said two sections are connected by said plug means, said wrapping in said two sections will also be connected.

5. The system as in claim 1 in which said conductive wrapping comprises a plurality of wires in side-by-side arrangement, covered at least on one side by an insulating layer to form a tape, said tape wrapped helically around said jacket.

6. The system as in claim 5 including adhesive means to attached said tape to said jacket.

7. The system as in claim 1 in which said conductive wrapping comprises a wrapping of at least one insulated wire.

8. The system as in claim 1 in which said potential applied to said wrapping is in the range of 10 to 40 volts.

9. The system as in claim 1 in which said voltage is in the range of 20–25 volts.

* * * * *